United States Patent Office 2,758,999
Patented Aug. 14, 1956

2,758,999
ESTERIFICATION OF PYRIDINE CARBOXYLIC ACIDS

Robert S. Aries and Albert P. Sachs, New York, N. Y., assignors, by direct and mesne assignments, to Nepera Chemical Co., Inc., Yonkers, N. Y., a corporation of New York No Drawing. Application April 4, 1952, Serial No. 280,647

10 Claims. (Cl. 260—295)

The present invention relates to the manufacture of esters of pyridine carboxylic acids from pyridine carboxylic acids and alcohols.

Esters of pyridine carboxylic acids are useful intermediates in the synthesis of numerous compounds. They can be readily converted to pyridine carboxamides by reaction with ammonia. The best known pyridine carboxamide is the important B vitamin niacinamide. Hydrazide derivatives of pyridine carboxylic acids can be readily prepared from the esters of pyridine carboxylic acids. These derivatives, more particularly those which are substituted in the gamma or four position have been reported to have anti-tubercular activity. In addition esters of pyridine carboxylic acids as such have very valued solvent properties.

The principal object of this invention is to improve existing methods for the preparation of esters of pyridine carboxylic acids starting with pyridine carboxylic acids and alcohols.

Heretofore, the method for making pyridine carboxylic acid esters has been to esterify the pyridine carboxylic acid and an alcohol in the presence of an acid catalyst such as sulfuric acid. Purification of the esterified reaction mass consisted of neutralizing the acid catalyst with aqueous ammonia at ice-water temperatures to prevent the hydrolysis of the esterified product. This was followed by several extractions with a solvent such as ethyl ether. Vacuum distillation of the dried solvent extract resulted in the recovery of the purified ester.

This procedure has the obvious disadvantages that it requires several processing steps such as neutralization and solvent extraction. In addition the catalyst cannot be reused and must be neutralized with aqua ammonia which adds to the cost of the operation. Neutralization in an aqueous solution is undesirable because of the possibility of the hydrolysis of the esterified product. This operation is usually done slowly over cracked ice. Even with these precautions hydrolysis is possible because of localized conditions of temperature and reactant concentration. Solvent extraction has the disadvantage of requiring the handling of large volumes of flammable material. The unavoidable loss due to handling of a volatile solvent adds to the cost of the operation.

This invention is characterized by a simplicity in operation over that which has been accomplished previously. It is characterized by fewer steps in the operation, less equipment, and a savings in catalyst and solvent costs. This new and novel procedure eliminates the necessity for neutralization at ice-water temperature and the subsequent solvent extraction. With this procedure the disadvantages listed in the above paragraph are overcome, resulting in a simpler and more economical procedure. High conversions to esterified product have been obtained by this procedure.

Pyridine carboxylic acids and esters of pyridine carboxylic acids contain a basis nitrogen group. These esters as such are volatile and can be readily distilled under reduced pressure with little difficulty. In the presence of an esterification acid catalyst such as sulfuric acid, the esters are rendered non-volatile. This has been attributed to the formation of a non-volatile salt by combination of the basic pyridine carboxylic acid ester and the acidic esterification catalyst. For example, in the preparation of methyl nicotinate the reaction product consists largely of non-volatile methyl nicotinate sulfate. Consequently prior art called for the neutralization of the acid catalyst at ice-water temperatures to prevent the hydrolysis of the ester to the pyridine carboxylic acid. This was followed by solvent extraction and distillation.

We have discovered that by using a specially prepared catalytic preparation, pyridine carboxylic acids can be esterified and distilled directly from the reaction mixture. The catalytic material can be used over and over again. As a consequence catalyst costs are greatly decreased and a simplification in equipment and operation is realized.

The catalyst is prepared by esterifying a pyridine carboxylic acid with an alcohol in the presence of an acidic catalyst. Apparently the salt produced by the combination of a pyridine carboxylic acid ester and an acidic material such as sulfuric acid is the actual catalytic agent. To this catalyst preparation is added the pyridine carboxylic acid and the alcohol for the esterification reaction. After the esterification the excess alcohol is first distilled out followed by the distillation of the ester under reduced pressure directly from the reaction product. The residue remaining has been shown to be suitable catalyst for subsequent esterifications.

Our invention is illustrated by the following examples. It is to be understood that these examples are by way of illustration and should not be interpreted as limiting the scope of our invention.

*Example 1*

Catalyst material was prepared by refluxing for 18 hours a mixture of 123 parts nicotinic acid, 375 parts normal butanol, and 45 parts of 95 percent sulfuric acid. The reflux entered a separator where a water layer separated out and the lighter butanol layer was returned automatically to the reaction mass. The resulting reaction product was used as the esterification catalyst for the following esterification reaction.

123 parts of nicotinic acid, 450 parts normal butanol were added to the catalyst mass and the mixture was refluxed as before using a separator to remove the water produced in the reactor. This mixture was refluxed for 24 hours. At the end of this reflux period the excess butanol was distilled out of the reaction mass. The butyl nicotinate was distilled out at an absolute pressure of 15 mm. of mercury.

To the residue remaining after the vacuum distillation was added a second batch of 123 parts nicotinic acid and 450 parts n-butanol. The esterification procedure was repeated as before. The yield of butyl nicotinate in each esterification was 80 percent.

*Example 2*

Example 1 was repeated exactly as given except that isonicotinic acid was used in place of nicotinic acid. Results obtained were substantially the same as had been obtained in Example 1.

*Example 3*

Example 1 was repeated except that methanol was used in place of the normal butanol.

Since water is completely miscible with methanol in all proportions, a separator was not used. Instead the reflux was returned directly to the reactor. The yield of ester obtained on distillation was 70 percent.

*Example 4*

The catalyst was prepared exactly as given in Example 1. In addition to the 123 parts of nicotinic acid and the 450 parts butanol that were added to the catalyst, 2 parts of 95 percent sulfuric acid were also added. The esterification and the distillation were carried out as described in Example 1. Ten such successive esterifications were done using the residue from the previous esterification as the catalyst. No reduction in yield or product quality could be detected in the course of the ten esterifications.

Higher conversions to esters can be obtained using the higher alcohols such as normal butanol. The reason for this is that the water formed in the course of the reaction can be separated from the reflux stream.

The catalyst volume will build up with successive esterifications. We have found that the catalyst volume can be kept substantially constant by drawing off the excess volume of the catalyst mixture in between esterification without a decrease in yield. This excess of catalyst can be readily treated by known methods to recover the pyridine carboxylic acid values that it contains. This procedure consists of a hydrolysis with water followed by precipitation of the pyridine carboxylic acid by adjusting the pH to the isoelectric point of the pyridine carboxylic acid. The acid can be filtered off, washed, dried, and reused in the esterification.

The process may be carried out using esterification catalysts other than sulfuric acid. For example, benzene sulfonic acid has excellent catalytic properties and can be substituted for sulfuric acid.

The process may be carried out using water soluble alcohols such as ethanol or isopropanol just as had been illustrated in Example 3. With water immiscible alcohols such as normal butanol it is highly desirabe to separate the water formed in the reaction by passing the reflux to a phase separator.

The process described shows a simplified and efficient procedure for obtaining in good yields esters of pyridine carboxylic acids, which are important intermediates for the preparation of products of high value. While the method has been described, it will be understood that various modifications in details of procedure, operating conditions, and concentrations of reactants may be introduced without departure from the scope of the invention.

We claim:

1. A cyclic process for the manufacture of esters of pyridine which comprises reacting a pyridine carboxylic acid with an alcohol in the presence of a strong acid salt of a pyridine carboxylic acid ester as catalyst, carrying out the reaction at reflux temperatures, recovering the pyridine carboxylic acid ester by distillation from the reaction medium, and using the residue as catalyst for additional esterifications.

2. The process of claim 1 in which the pyridine carboxylic acid is nicotinic acid.

3. The process of claim 1, in which the pyridine carboxylic acid is isonicotinic acid.

4. The process of claim 1 in which the alcohol is miscible with water in all proportions.

5. The cyclic process for the manufacture of butyl nicotinate which comprises reacting nicotinic acid with normal butanol in the presence of a sulfuric acid salt of butyl nicotinate as catalyst, carrying out the reaction at reflux temperature, separating the water layer from the said reflux, returning the butanol layer to the esterification vessel, and recovering the butylnicotinate by distillation from the reaction mass and using the residue from the distillation as catalyst for additional esterification.

6. The process of claim 1, in which the esterification catalyst is the sulfuric acid salt of a pyridine carboxylic acid ester.

7. The process of claim 1, in which the esterification catalyst is the benzene sulfonic acid salt of a pyridine carboxylic acid ester.

8. The cyclic process for the manufacture of butyl isonicotinate which comprises reacting isonicotinic acid with normal butanol in the presence of the sulfuric acid salt of butyl isonicotinate as catalyst, carrying out the reaction at reflux temperature, separating the water layer from the said reflux, returning the butanol layer to the esterification vessel, and recovering the butyl isonicotinate by distillation from the reaction mass and using the residue from the distillation as catalyst for additional esterification.

9. The cyclic process for the manufacture of butyl nicotinate which comprises refluxing nicotinic acid with normal butanol in the presence of a catalytic mass prepared by refluxing nicotinic acid, normal butanol, and sulfuric acid, carrying out the main reaction at reflux temperature, separating the water layer from the said reflux, returning the butanol layer to the esterification vessel, and recovering the butylnicotinate by distillation from the reaction mass and using the residue from the distillation as catalyst for additional esterification.

10. The process for the production of esters of a pyridine carboxylic acid which comprises reacting a pyridine carboxylic acid with a water-immiscible alcohol in the presence of a strong acid salt of said pyridine carboxylic acid ester as catalyst, carrying out the main reaction at reflux temperature, and recovering the pyridine carboxylic acid ester by distillation from the reaction medium.

References Cited in the file of this patent
UNITED STATES PATENTS 2,280,040    Seibert et al. _____ Apr. 14, 1942